J. F. GRABILL.
SHOCK ABSORBING STEERING KNUCKLE FOR AUTOMOBILES.
APPLICATION FILED MAY 16, 1917.
1,249,616. Patented Dec. 11, 1917.
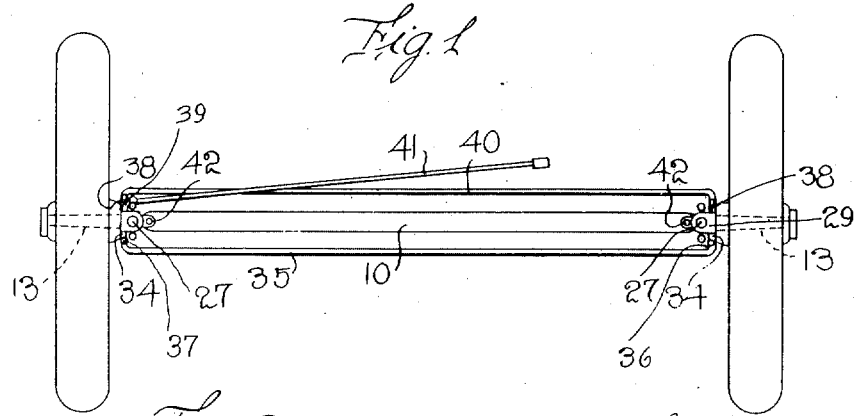
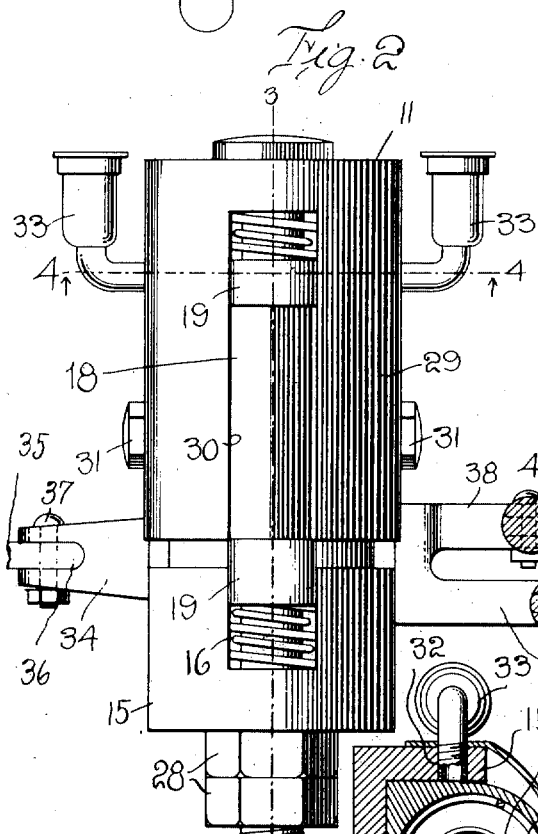
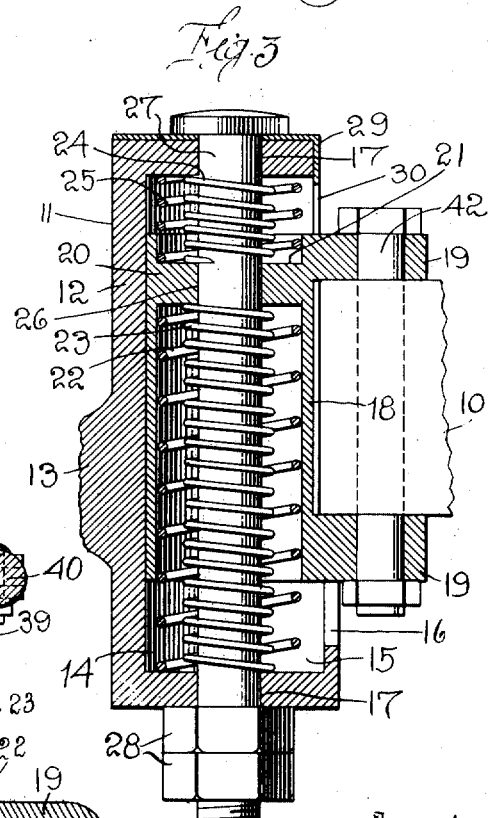
Inventor
JOHN F. GRABILL
By Watson E. Coleman
Attorney

UNITED STATES PATENT OFFICE.

JOHN F. GRABILL, OF FLORA, ILLINOIS.

SHOCK-ABSORBING STEERING-KNUCKLE FOR AUTOMOBILES.

1,249,616.

Specification of Letters Patent.  Patented Dec. 11, 1917.

Application filed May 16, 1917.  Serial No. 169,078.

*To all whom it may concern:*

Be it known that JOHN F. GRABILL, a citizen of the United States, residing at Flora, in the county of Clay and State of Illinois, has invented certain new and useful Improvements in Shock-Absorbing Steering-Knuckles for Automobiles, of which the following is a specification, reference being had to the accompanying drawings.

This invention relates to automobiles, and particularly to the steering knuckles thereof.

The general object of the invention is to provide a combined shock absorber and steering knuckle, and to this end to provide a steering knuckle and an axle having sliding engagement with each other and provide shock absorbing springs disposed within the knuckle and between the sliding member connected to the axle and the knuckle.

A further object is to provide a construction of this kind which may be readily taken apart for repair or replacement of the springs and in which the springs may be readily oiled.

Another object is to provide a construction of this character in which the steering knuckles are connected by a connecting rod which in addition to the usual reach rod which connects the steering knuckles to thus secure steadiness of movement for the knuckles.

A further object is to provide a construction of this character in which the wheels are disposed at a greater distance from the pivotal center of the knuckle so as to permit the wheels to revolve when the car is standing still, instead of sliding.

A further object is to provide a shock absorbing knuckle which will thus take the strain off of the axle and make the axle less liable to bend.

Other objects will appear in the course of the following description.

My invention is illustrated in the accompanying drawings, wherein:—

Figure 1 is a top plan view on the forward axle of an automobile showing my improved knuckles applied thereto;

Fig. 2 is a front elevation of a steering knuckle constructed in accordance with my invention;

Fig. 3 is a vertical sectional view on the line 3—3 of Fig. 2;

Fig. 4 is a section on the line 4—4 of Fig. 2.

Referring to these drawings, 10 designates the axle of the automobile which may be of any suitable form, and 11 designates generally the steering knuckle, which comprises an outer casing 12 having a stub 13 projecting therefrom upon which the wheel is adapted to be mounted in the usual manner. This outer casing has a flat inside wall 14 and lateral walls 15, which curve inward at their lower ends defining a slot 16 adjacent the lower end of the casing. The upper and lower ends of the casing are formed with bolt-holes 17 for the passage of a central bolt.

Disposed within the casing 12 and movable longitudinally therein is a sliding block 18, provided at its upper and lower ends with outwardly projecting ears 19 perforated for the passage of a pintle. The lower ear 19 projects out through the slot 16 and is guided by the walls of this slot. In plan, the ends of the sliding member 18 have approximately the same form as the cross sectional form of the casing 12 so that the member 18, while vertically slidable in the casing, cannot rotate therein. At its upper end, the slide 18 is provided with an inwardly extending annular flange 20 and with a spring seat 21 above this flange. The slide 18 is hollow for the reception of a single or a double relatively heavy coil spring. I have illustrated two coil springs, designated respectively 22 and 23, but it will be understood that for light cars, a single spring will be sufficient. The coil springs 22 and 23 bear against the lower end of the casing 12 and disposed between the slide 18 and the upper end of the casing 12 is a single or a double coiled spring. Two coiled springs have been shown, designated 24 and 25. These coil springs 24 and 25, however, are lighter than the coil springs 22 and 23. Passing longitudinally through the casing 17 and through the coil springs and through the central opening 26 defined by the flange 20 is a bolt 27 having a head at its outer end, the lower end of the bolt being screw-threaded for engagement by a nut 28. Disposed over the top of the casing 17 and extending down over the front of the casing is a cap 29 of sheet metal, formed with a longitudinally extending slot 30 disposed in alinement with the slot 16 and practically forming a continuation of this slot. The uppermost lug 19 slides in this slot 30. This cap extends over the top of the casing 12 and is formed with an aperture for the passage of the bolt 27. The sides of the cap are also formed with apertures through which screws 31 may be inserted to hold the cap in position upon the casing 12, the casing 12 being also formed with screw-threaded apertures to receive said casing. Thus the cap is made readily removable. The head of the bolt 27 fits over the top of the cap.

The side walls of the casing 12 are formed with perforations 32 preferably screw-threaded so that oil cups 33 may be connected to the side walls to lubricate the spring and slide.

The casing 12 on one side wall is formed with the outwardly projecting lug or stud 34, which is bifurcated for engagement with a connecting rod 35 having angular extremities 36 connected to the stud 34 by means of a pintle 37. This connecting rod 35 extends over to the corresponding stud 34 on the opposite knuckle and preferably is disposed forward of the pair of knuckles. Extending rearward from the side wall of the casing 12 are a pair of lugs or studs 38 and 39, each of which is bifurcated, these studs being disposed in divergent relation to each other and one of these studs being adapted to be connected to a steering rod 40 and the other to a reach rod 41. It will be understood that the knuckle on the opposite side of the machine has a stud 38 engaged by the steering rod but no stud engaged by the reach rod.

The axle 10 is connected to the ears 19 by means of a pintle bolt 42 and preferably bushings will be disposed around this pintle bolt 42 and through the lugs 19 and preferably the bolt will be a lubricating bolt, though this is not shown.

The advantages of this construction reside in the fact that the jar communicated from the wheels to the axle is cushioned or absorbed at the point of connection between the knuckles and the axle so that the axle is subjected to less strain and will not be so readily bent or broken. The springs above and below the slide tend to reduce and cushion the movement of the axle in either direction relative to the wheel. It will be seen that the slide is guided vertically so as to keep the spring straight and take the strain off of the bolt that goes through the absorber. These shock absorbers will take the strain off of the regular springs and off of the axle and, furthermore, as the wheels are disposed farther away from the pintles 42, the wheels will not slide as they do now when the machine is steered clear around to start it. This shock absorber will act to save the tires also and the casing or cap 29 will prevent the access of dust to the interior of the casing.

It will furthermore be obvious that this shock absorber will take off the sudden jars and jolts from the engine and reduce the extent to which the engine is shaken by these sudden jars and jolts and thus reduce the likelihood of the parts of the engine shaking loose.

Having described my invention, what I claim is:—

1. A shock absorbing knuckle for vehicles comprising a casing having an axle spindle extending therefrom and having a vertical slot, a sliding member entirely housed within the casing and having a lug extending outward through the slot, an axle pivotally connected to the lug, and springs yieldingly resisting the vertical movement of the sliding member in opposite directions.

2. A shock absorbing knuckle, comprising a casing having a vertically extending slot and formed with an axle spindle, a sliding member mounted within the casing and having lugs extending outward through said slot whereby the sliding member may be guided, springs disposed between the upper and lower ends of the casing and the sliding member and resisting movement of the sliding member, and an axle pivotally connected to the lugs of said sliding member.

3. A shock absorbing knuckle comprising an outer casing having an axle spindle extending therefrom and formed with a longitudinally extending slot and with arms adapted to be connected to the steering gear of a vehicle, a slide mounted within the casing and having outwardly projecting lugs, an axle pivotally connected to the lugs, a bolt passing longitudinally through the casing and through said sliding member and guiding it, and springs surrounding the bolt and disposed between the ends of the sliding member and the adjacent ends of the casing and yieldingly resisting longitudinal movement of the sliding member.

4. A shock absorbing knuckle comprising a casing having a bottom and a top wall and side walls, the lower ends of the side walls extending around the front of the casing and being formed with a vertically disposed slot, a cap extending over the top of the casing and down the front thereof and formed with a longitudinally extending slot, a sliding member mounted within the casing and held from rotatable movement and having lugs extending out through the slots in the cap and the casing, a bolt passing longitudinally through the casing and through said sliding member and on which the sliding member slides, and springs surrounding said bolt and disposed between the ends of the casing and said sliding member, said casing being formed with a steering arm and an axle spindle.

5. A shock absorbing knuckle comprising a casing having a bottom and a top wall and side walls, the lower ends of the side walls extending around the front of the casing and being formed with a vertically disposed slot, a cap extending over the top of the casing and down the front thereof and formed with a longitudinally extending slot, a sliding member mounted within the casing and held from rotatable movement and having lugs extending out through the slots in the cap and the casing, said sliding member being hollow and formed at its upper end with an annular flange, a bolt passing longitudinally through the casing and through the sliding member, a spring bearing at its upper end against the top of the casing and against the annular flange, a spring bearing against the lower end of the casing and extending into the sliding member and bearing against said flange, an axle pivotally connected to said lugs, and a steering rod operatively connected to the casing.

6. A shock absorbing knuckle for vehicles comprising a casing having an axle spindle extending therefrom, a sliding member mounted within the casing, an axle pivotally connected to the sliding member, and springs disposed within the casing above and below the sliding member and yieldingly resisting vertical movement of the sliding member in opposite directions, the spring resisting downward movement of the sliding member having greater strength than the spring resisting upward movement of the sliding member.

In testimony whereof I hereunto affix my signature in the presence of two witnesses.

JOHN F. GRABILL.

Witnesses:
F. E. GOLDSBY,
C. O. RIGGLE.